March 22, 1955

A. LONGACRE 2,704,843

V-BEAM RADAR SYSTEM

Filed Dec. 1, 1944

INVENTOR.
ANDREW LONGACRE
BY William D. Hall
Attorney

March 22, 1955　　　A. LONGACRE　　　2,704,843
V-BEAM RADAR SYSTEM

Filed Dec. 1, 1944　　　　　　　　　　　　3 Sheets-Sheet 2

INVENTOR.
ANDREW LONGACRE
BY
William D. Hall.
Attorney.

March 22, 1955  A. LONGACRE  2,704,843
V-BEAM RADAR SYSTEM
Filed Dec. 1, 1944  3 Sheets-Sheet 3

*INVENTOR.*
ANDREW LONGACRE
BY
*Harry M. Saragovitz*
*Attorney*

United States Patent Office 2,704,843
Patented Mar. 22, 1955

2,704,843

V-BEAM RADAR SYSTEM

Andrew Longacre, Exeter, N. H., assignor, by mesne assignments, to the United States of America as represented by the Secretary of War Application December 1, 1944, Serial No. 566,162

14 Claims. (Cl. 343—11)

This invention relates to a method of and system for locating aircraft or other objects with reference to space coordinates such as height, range and azimuth, and particularly to a method of and system for locating objects in which a modified form of radio V-beam is employed.

V-beam searching such as may be utilized in ground control of interception (GCI) systems employs two substantially plane, pulsed beams of radiant energy which are maintained at a fixed inclination relative to each other so that the resultant beam is V-shaped in section and are rotated in unison about a vertical axis. The V-beam consists of two discrete sheet-like beams which diverge in the vertical direction and which may intersect along the line parallel to the earth's surface or tangent thereto. In addition, the two beams may be displaced from each other in the azimuthal direction so that their lower portions or their intersections with the earth form a predetermined azimuthal angle. One of the beams is preferably perpendicular to the earth's surface and is relatively narrow in azimuth and much broader in elevation. The other of said beams has the same characteristics as the first beam but is inclined with respect to the earth's surface whereby the azimuthal separation between the adjacent surfaces of the respective beams is proportional to the altitude. Echoes received from a target as the two beams successively impinge thereon are separated by an interval which is a measure of the height of the target. V-beam systems which have been proposed heretofore were characterized by the disadvantages that both of the beams were inclined with respect to the vertical and there was only a single receiving channel for the two beams. In these prior arrangements it was not feasible to utilize either of the beams for other types of scanning such as plan position indication (PPI); moreover, there tended to be confusion between the echo signals from the two beams where the target was at a low altitude, thereby making the accurate determination of height extremely difficult if not impossible.

The primary object of this invention is to augment the utility of V-beam systems by enabling ready determination of the height of low-flying aircraft or other targets near the earth's surface, and by making one of the beams available for PPI scanning in addition to the height-finding function. This is accomplished by employing a vertical beam and an inclined beam and providing receiving channels therefor which are separate and distinct. In one embodiment of the invention the two energy beams are separated, at the ground plane, by a fixed azimuth angle to facilitate presentation of the echo images in a single indicator picture. It is also contemplated, however, that the images may be displayed in separate pictures if desired. Various other advantageous features will be apparent in the following disclosure.

The present disclosure is primarily concerned with the method of height-finding using the improved V-beam. Apparatus which may be employed for presenting the received echo images on an indicator is disclosed in the copending application of Richard W. Lee, Serial No. 566,164, filed December 1, 1944.

Figure 1:
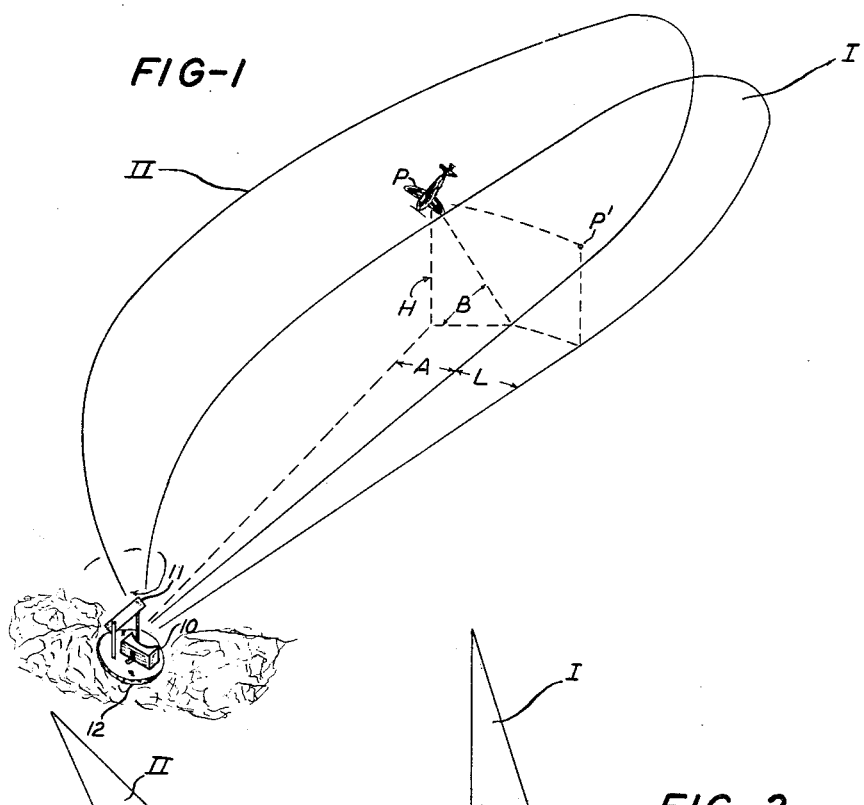
Fig. 1 is a perspective view of the radar station showing schematically the radiation patterns of the two energy beams.
Figure 3:
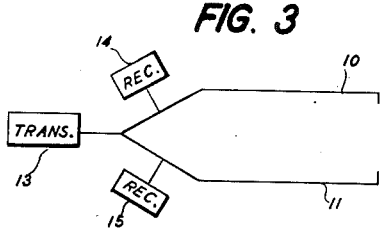
Figs. 3 and 4 are block diagrams of systems embodying the present invention.

Two directional antennas 10 and 11, Fig. 1, are respectively employed to produce a vertical beam I and an inclined beam II. Antennas 10 and 11 may be any of the many well-known arrays for producing plane sheet-like radiation patterns. One such antenna array is shown in Fig. 3 of Alvarez Patent No. 2,480,208. The beam I may serve the dual purpose of obtaining range and azimuth data for a PPI scan, and also furnishing a part of the information for the determination of height as in the present instance. The angle which the beam II makes with the vertical plane of beam I may have any suitable value, and as one example, it may be of the order of 45°. The antennas 10 and 11 are carried by a revolving mount 12 which rotates about a vertical axis, so that the two beams rotate in unison preferably with beam I in the lead. Radiant energy in the vertical beam I impinges upon a target, such as the airplane P, at point P' in the plane of this beam. Thereafter the inclined beam II impinges upon the target P as shown in Fig. 1. Echo signals reflected from the target P in the two radiation fields are received in sequence by the radio object-locating apparatus associated with the antennas 10 and 11. It may readily be seen that the greater the height of the aircraft, the greater will be the azimuth spacing between the points of incidence P and P' due to the angular divergence of the beams I and II and consequent increased separation thereof at higher altitudes. This variable spacing is utilized in the determination of target height as will be explained.

Figure 4:
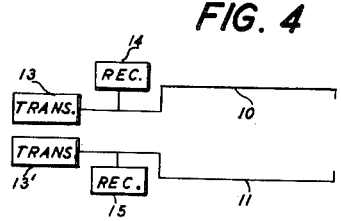
Figure 5:
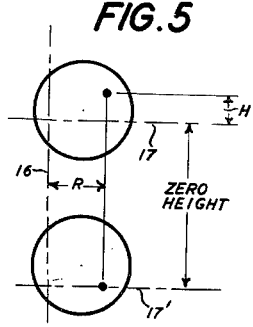
Figs. 5 and 6 are schematic views showing different forms of target image presentation.
Figure 6:
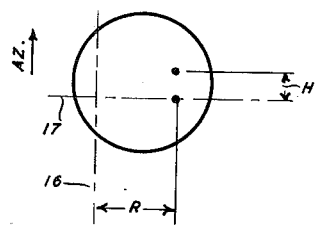

As mentioned hereinabove, one of the features of the present invention is the provision of separate receiving channels for the two energy beams. One form of system embodying this principle is shown schematically in Fig. 3, wherein a transmitter 13, including a suitable pulse generator such as a magnetron oscillator, feeds the vertical-beam antenna 10 and the inclined-beam antenna 11. Receivers 14 and 15 are associated with the antennas 10 and 11, respectively. The usual transmit-receive switches (not shown) are incorporated in the structure to prevent transmitted energy from entering the receiver but enabling the received energy to reach the receivers without appreciable loss. The video outputs of both receivers 14 and 15 may be indicated on separate oscilloscopes or may be used to modulate the intensity grid of a single oscilloscope, the screen of which is diagrammatically indicated in Fig. 6. The horizontal sweep, or time base, of such oscilloscope is provided by a saw tooth wave generated in synchronism with the pulsing of transmitter 13 and applied to the horizontal deflecting means of the oscilloscope. Means controlled by the antenna rotating mechanism generates a voltage proportional to the instantaneous azimuth of the antenna beam and is applied to the vertical deflecting means of the oscilloscope. The resultant indication of the target on the oscilloscope screen in Fig. 6 is a bright dot whose distance R from a fiducial line 16 is a measure of the target distance, and whose height H from a fiducial line 17 is a measure of the azimuthal orientation of the plane of beam I. Thus, if the lower dot in Fig. 6 represents the azimuthal position of the beam I when it hits the target, then the upper dot will represent the azimuthal angle through which the antennas have rotated when beam II hits the target, whereby the distance H is a measure of the altitude of the target. In practice, indicator circuits such as shown in the Lee application, supra, may be used. In Fig. 4, separate transmitters 13 and 13' are provided to feed the antennas 10 and 11. With this arrangement different frequencies may be used in the two radiation fields if desired. The use of separate receivers 14 and 15 in these embodiments enables display of the target images in separate indicator pictures in a manner such as illustrated, for example, in Fig. 5. The interconnection between the components of Fig. 4 and the separate oscilloscopes represented diagrammatically in Fig. 5 may be the same as above described in connection with Figs. 3 and 6, with the exception that each receiver controls the intensity grid of a separate oscilloscope. In all other respects, both oscilloscopes are controlled by the same potentials. As shown in Fig. 5, the range R of the target is indicated by horizontal displacement of the images from a fiducial line as 16. Fiducial lines as 17 and 17′ on the two pictures may be spaced apart vertically in an amount representative of a target at zero height. The difference between the actual vertical spacing of the two images and the distance between the lines 17 and 17′ indicates the target height H. This arrangement is of utility especially in distinguishing between the images of a target at a low altitude, such as a low-flying aircraft. If the images are presented in a single picture, there is a tendency for them to merge and become indistinct, unless resort is had to a modification of the system which will be described presently. With separate displays, however, accurate determination of height H can be made down to very small values thereof.

Separation and distinct presentation of the received echoes from a low-altitude target is particularly important where the images are displayed in a single picture, as in Fig. 6. In one such system it is proposed to so arrange the apparatus that the bases of the beams I and II are separated in azimuth by a lag angle L, Fig. 1, which, in this embodiment, is about 10°. It is understood that other suitable values of the angle L may be used if desired. Thus, following the incidence of the beam I upon the target P, the beam II sweeps through the azimuth angle L and then traverses an azimuth angle A before striking this target, the magnitude of angle A being a function of the height H of the target. It is generally assumed herein that the target remains relatively stationary while being scanned by the two beams, this being a sound assumption for practical purposes. While this expedient renders the geometrical analysis of the system more convenient, it is not a necessary condition for the successful operation of the system, inasmuch as a correction factor may readily be introduced in those instances where the movement of the target is likely to have an appreciable effect upon accuracy.

At any given range the magnitude of the angle A, together with the constant value of L, determines the interval between the echo signals from the points P and P′, thereby affording a measure of the height H which can readily be interpreted by the receiving apparatus. The magnitude of the angle A is affected by the range of the target P, becoming relatively smaller for a given height as the range increases. It will be shown presently by geometrical analysis that the height H may be expressed as a function of two variables comprising the angle A and the range R from the radiation source to the target. Radio object-locating apparatus adapted for use in V-beam search systems, such as that of the character disclosed in the aforesaid copending application, is capable of ascertaining and presenting a visual indication of the spaced target echoes with reference to the coordinates of range and azimuth, as shown, for example, in Fig. 6. A chart or graphical overlay may be utilized to determine the height of the target directly from the information presented.

Figure 9:
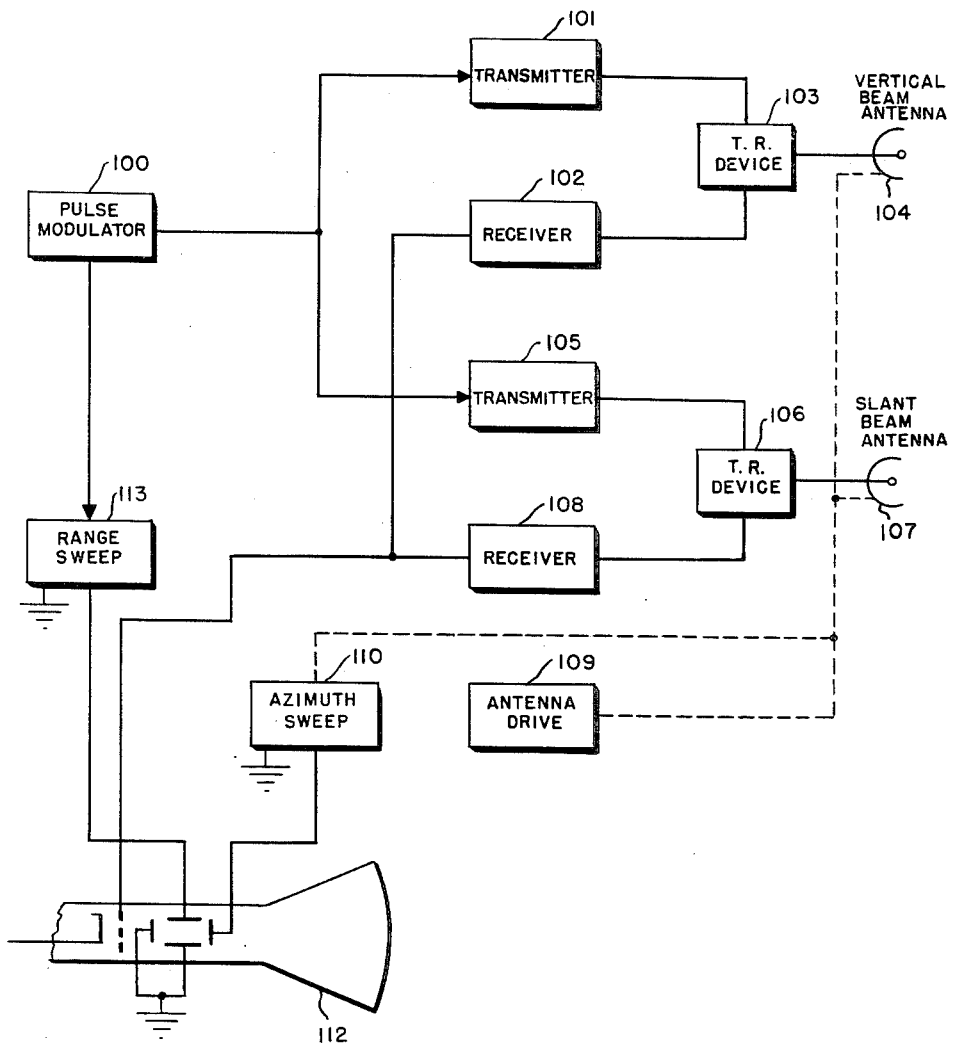
Fig. 9 is a complete radio object locating system incorporating the present invention.

Fig. 9 shows a complete radio object locating system incorporating the present invention. Pulse modulator 100 is employed for simultaneously pulsing transmitters 101 and 105. The output of transmitter 101 is passed through TR device 103 to vertical beam antenna 104 and the output of transmitter 105 is passed through TR device 106 to slant beam antenna 107. Both vertical beam antenna 104 and slant beam antenna 107 are rotated in unison in azimuth by antenna drive 109. Echoes received by vertical beam antenna 104 are passed through TR device 103 to receiver 102 and echoes received by slant beam antenna 107 are passed through TR device 106 to receiver 108. The outputs of both receivers 102 and 108 are applied to the control electrode of cathode ray tube 112 to intensity modulate the electron beam thereof. Range sweep 113 is synchronized with pulse modulator 100 and the output thereof is applied to the horizontal deflecting elements of cathode ray tube 112. Azimuth sweep 110 is synchronized with antenna drive 109 and the output thereof is applied to the vertical deflection elements of cathode ray tube 112. Although deflection plates are shown in Fig. 9, deflection coils can be substituted, as is well known in the art. It will be seen that the indication shown in Fig. 6 will appear on the screen of cathode ray tube 112.

Figure 2:
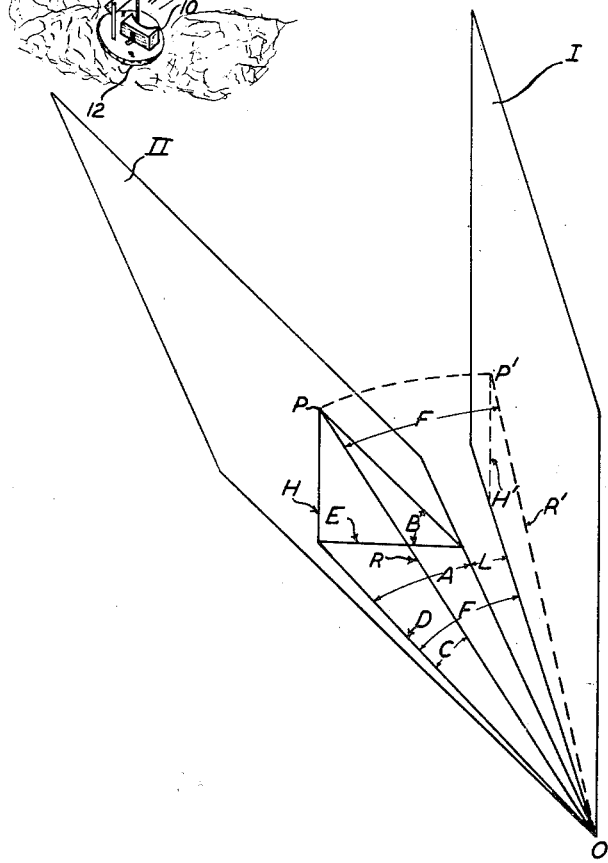
Fig. 2 is a diagrammatic perspective view illustrating certain geometrical relationships.

Referring now to Fig. 2, which presents a simplified picture of the various geometrical relationships involved, it may be seen that:

$$H = R \sin C = R \frac{\tan C}{\sqrt{1 + \tan^2 C}}$$

where $R$ = range and $C$ = angle of elevation subtended by the range line R from the radiant beam source O to the target P.

Tan C in the above equation may be expressed in terms of B (the angle between beam II and the horizontal) and the angle A, which has been defined hereinabove, thus:

$$\tan C = \tan B \sin A$$

This identity may be proved by considering that $$\tan B = \frac{H}{E}$$

where E is the base of a right triangle the other two sides of which comprise the perpendicular H from point P to the earth's surface and another perpendicular extending from P in the plane of beam II to the base of this beam; and $$\sin A = \frac{E}{D}$$

where D is the hypotenuse of a right triangle the other two sides of which comprise the line E and the portion of the base of the beam II extending from this line back to the beam source O. Therefore:

$$\tan B \sin A = \frac{H}{E} \times \frac{E}{D} = \frac{H}{D} = \tan C$$

If B is 45°, $\tan B = 1$ and $\tan C = \sin A$. Hence, $$H = R \frac{\sin A}{\sqrt{1 + \sin^2 A}}$$

As mentioned hereinabove, indicators used in this system are adapted to present two spaced target images which are located on a viewing screen against the coordinates of azimuth and range, the distance separating the two images on the screen being indicative of the magnitude of the azimuth angle $(L+A)$, where L is constant and A is a function of the height H of the target. The chart or overlay which is used to read the height may conveniently be prepared in the form of a mathematical family of curves representing constant values of H and following the relation:

$$H = R \frac{\sin (F-L)}{\sqrt{1 + \sin^2 (F-L)}}$$

where F is the total azimuth angle between the points of incidence P and P′, Fig. 2. This may be further modified in the event some means is employed to compensate for the narrowing effect of increased range upon the angle A, as is disclosed in greater detail in the aforesaid Lee application, and to take the earth's curvature into account.

Figure 7:
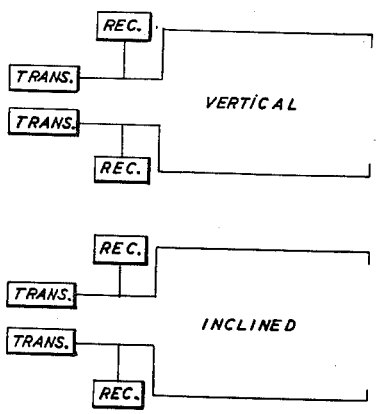
Fig. 7 is a block diagram of another system embodying the invention.
Figure 8:
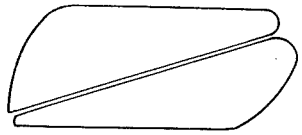
Fig. 8 is a view showing, in elevation, a radiation beam pattern produced by the system illustrated in Fig. 7.

In practice it is found advantageous to employ a plurality of antennas and associated transmitters and receivers for each of the radiation beams, as shown in Fig. 7. Each beam then consists of a plurality of superposed complementary lobes, somewhat as illustrated in Fig. 8, thus increasing the coverage of each beam in its respective plane. Fig. 8 merely shows two beams superposed so that they complement each other to form a wider plane beam. The upper and lower lobes of Fig. 8 are respectively those of the upper and lower "vertical" antennas of Fig. 7. The upper and lower "inclined" antennas of Fig. 7 will also produce two complementary beams such as shown in Fig. 8. The antenna structure which produces said beams would be situated at the lower left-hand corner of Fig. 8. The term "beam" as used herein, therefore, should be so construed as to include patterns such as that shown in Fig. 8.

It is believed that the advantages of this invention are apparent from the foregoing description and the drawings. A salient feature is the provision of separate receiving channels for the component beams I and II. Target signals from low-flying aircraft or other objects are distinctly presented on the indicator. Availability of range and azimuth data in addition to target height is of great utility. An additional advantage is that a uniform rotative speed of the antennas is not necessary, inasmuch as height is determined from the angular separation of the points P and P', in azimuth degrees, rather than the time interval between echoes. To achieve this result the azimuth sweep of the indicator may be correlated with the movement of the antennas in any suitable way, for instance, by utilizing an angle sweep voltage generated by means associated with the rotating antenna mount to control the indicator sweep voltage.

What is claimed is:

1. A system of radio object-height finding including means for establishing two substantially plane beams of radiant energy having a fixed angle of inclination relative to each other, one of said beams lying in a vertical plane and the plane of the other beam being inclined with respect to the vertical, said beams being spaced apart by a predetermined azimuth angle at their lowest portions, and means for rotating said beams about a vertical axis while maintaining said relative angle of inclination and said spacing constant.

2. A system of radio object-height finding including means for establishing two substantially plane radiation beams having a fixed angle of inclination relative to each other, one of said beams lying in a vertical plane and the other beam lying in a plane inclined with respect to the vertical, and means for rotating said beams about a vertical axis while maintaining said relative angle of inclination constant.

3. A system of radio object-height finding which includes means fo restablishing two substantially plane beams of radiant energy having a fixed angle of inclination relative to each other, and means for rotating said beams in unison about a vertical axis while maintaining the planes of said beams divergent by some fixed amount along their lowest portions in a direction away from said vertical axis.

4. In a radio echo detection system for determining the height of an object, the combination of means for establishing a substantially sheet-like beam of pulses of radiant energy having a predetermined acute angle of inclination with respect to the horizontal, means for establishing another substantially sheet-like beam of pulses of radiant energy lying in a vertical plane each of said means including an antenna, said antennas being oriented relative to each other to provide that said beams are also spaced apart by a predetermined azimuth angle at the lowest portions thereof, and means for rotating both said beam-establishing means in unison about a common vertical axis while maintaining the relative inclination and spacing of said beams substantially constant.

5. In a radio object-locating system, means for establishing a substantially flat, sheet-like beam of pulses of radiant energy having a predetermined acute angle of inclination with respect to the horizontal, means for establishing another substantially flat, sheet-like beam of pulses of radiant energy having a fixed angle of inclination relative to said first-mentioned beam, each of said means including an antenna, said antennas being oriented relative to each other to provide that said beams are also spaced a part in azimuth by a predetermined amount at the lowest portions thereof, means for rotating both said beam-establishing means in unison about a common vertical axis while maintaining the relative inclination and spacing of said beams substantially constant, and means responsive to echo signals reflected by an object from said radiant energy beams for indicating the range, azimuth and height of such object.

6. In a radio object-locating system, means for establishing two substantially flat, sheet-like beams of pulses of radiant energy having a predetermined acute angular divergence in an upward direction, means for rotating said beam-establishing means in unison about a vertical axis while maintaining the relative inclination of said beams substantially constant, means affording separate echo signal receiving channels for said energy beams, and indicating means controlled by said receiving means for displaying separate images of the echo signals reflected by an object as said energy beams respectively impinge thereon.

7. A system of radio object-height finding during search-scanning which comprises means for generating two substantially plane, vertically divergent beams of radiant energy having a fixed angle of inclination relative to each other, one of said beams lying in a vertical plane and being much wider in the vertical direction than in the azimuthal direction, the other beam being similarly much wider along its plane than in the azimuthal direction, and means for rotating said beams in unison about a vertical axis in the performance of said search scanning.

8. A system of radio-object height finding as set forth in claim 7 which includes means for concurrently pulsing said beams, means for successively receiving echoes of the pulses, and means for determining from the intervals between such successive reception the object height.

9. The system of radio-height finding as set forth in claim 7, which includes means for concurrently pulsing said beams for short periods spaced at intervals considerably longer than said periods, means for successively receiving echoes of the pulses along the respective beams during said intervals, and means for separately displaying said echoes to provide an indication of the object height.

10. The system of radio-height finding as set forth in claim 7, which includes means for concurrently pulsing said beams for short periods spaced at intervals considerably longer than said periods, means for successively receiving echoes of the pulses along the respective beams during said intervals, and means for simultaneously displaying said echoes at spaced points to provide an indication of the object height.

11. A V-beam radio object-locating system, comprising a microwave pulse transmitter, an antenna means connected to said transmitter for establishing a substantially flat, sheet-like beam of radiant energy having its maximum width along a plane at a predetermined acute angle of inclination with respect to the vertical, a second antenna means connected to said transmitter for establishing another substantially flat, sheet-like beam of radiant energy having its maximum width in the vertical direction and both of said beams being considerably narrower in the azimuthal direction than in the directions of their maximum width, said antenna means being oriented relative to each other to provide that said beams are also spaced apart in azimuth by a predetermined amount at the lowest portions thereof, means for rotating both said antenna means in unison about a common vertical axis while maintaining the relative inclination and spacing of said beams substantially constant, the direction of rotation being such that the vertical beam leads the inclined beam, receivers connected to each of said antenna means responsive to echo signals reflected by an object from each of said radiant energy beams, and means for indicating the range azimuth and height of such object connected to said receivers.

12. The system defined in claim 11 wherein the said angle of inclination to the vertical of the first-mentioned radiant energy beam is 45°.

13. A V-beam radio object-locating system comprising a microwave pulse transmitter, an antenna means connected to said transmitter for establishing a substantially flat-sheet-like beam of radiant energy having its maximum width along a plane inclined 45° with respect to the vertical, a second antenna means connected to said transmitter for establishing another substantially flat sheet-like beam of radiant energy having its maximum width in the vertical direction, both of said beams being considerably narrower in the azimuthal direction than in the directions of their maximum widths, said antenna means being oriented relative to each other to provide that said beams are also spaced apart in azimuth by a predetermined amount at the lowest portion thereof, means for rotating both said antenna means in unison about a common vertical axis while maintaining the inclination and azimuthal spacing of said beams relative to each other substantially constant, the direction of rotation being such that the vertical beam leads the inclined beam, receivers connected to each of said antenna means for separately receiving echo signals reflected by an object from each of said radiant energy beams, a plan position indicator connected to that receiver which is connected to the second antenna means, and oscilloscope means connected to said receivers for giving a cartesian coordinate indication of the range and azimuth at which the said object is intercepted by each of said beams.

14. A system of radio object-location which comprises means for generating two substantially flat, sheet-like beams of pulses of radiant energy having a predetermined amount of angular divergence in an upward direction, means for rotating said beams in unison about a vertical axis while maintaining the relative inclination thereof substantially constant, means for separately receiving the echo signals reflected by an object as said beams respectively impinge thereon, and means for separately displaying the echo images of said object along cartesian coordinates representing range and azimuth to indicate the location of said object.

References Cited in the file of this patent

UNITED STATES PATENTS

| | | |
|---|---|---|
| 2,231,929 | Lyman | Feb. 18, 1941 |
| 2,297,395 | Erben | Sept. 29, 1942 |
| 2,344,153 | Leonard | Mar. 14, 1944 |
| 2,399,017 | Goldman | Apr. 23, 1946 |
| 2,403,622 | Tuska | July 9, 1946 |
| 2,415,094 | Hansen et al. | Feb. 4, 1947 |
| 2,415,095 | Varian et al. | Feb. 4, 1947 |
| 2,459,481 | Wolff et al. | Jan. 18, 1949 |
| 2,480,208 | Alvarez | Aug. 30, 1949 |
| 2,538,800 | Ranger | Jan. 23, 1951 |